United States Patent [19]

Grauel et al.

[11] Patent Number: 4,551,852
[45] Date of Patent: Nov. 5, 1985

[54] PROCESS FOR SPREADING THE VOLUME OF TRAFFIC OVER DIFFERENT CONTROL CHANNELS OF A CELLULAR RADIO TRANSMISSION SYSTEM

[75] Inventors: Christoph Grauel, Feucht, Fed. Rep. of Germany; Philippe Duplessis; Alain Tarabout, both of Velizy, France

[73] Assignee: U.S. Philips Corporation, New York, N.Y.

[21] Appl. No.: 562,385

[22] Filed: Dec. 16, 1983

[30] Foreign Application Priority Data

Dec. 17, 1982 [DE] Fed. Rep. of Germany ....... 3246743

[51] Int. Cl.$^4$ ............................................ H04B 7/00
[52] U.S. Cl. ...................................... 455/33; 455/54; 455/38
[58] Field of Search ...................... 455/33, 34, 54, 56, 455/31, 38; 179/2 EB

[56] References Cited

U.S. PATENT DOCUMENTS 3,582,787 6/1971 Muller et al. .................... 455/33
3,898,390 8/1975 Wells et al. ...................... 455/34
4,228,319 10/1980 De Jagger et al. ............... 179/2 EB

FOREIGN PATENT DOCUMENTS 53930 4/1980 Japan ................................. 455/33
102138 8/1981 Japan ................................. 455/56

Primary Examiner—Jin F. Ng
Attorney, Agent, or Firm—Thomas A. Briody; William J. Streeter

[57] ABSTRACT

A system and process is described for spreading the volume of traffic over different control channels of a cellular radio transmission system. A base station having at least two control channels subdivides the number of mobile radio stations in a cellular area of the base station into groups, of a variable number of groups. The base stations transmit the number of groups and a group code on each control channel. The mobile stations receiving the transmitted information detect the number of groups and group code of each channel. The mobile radio stations will combine the number of groups and the received group code with the stored group number. The result of this combination determines the channel over which the mobile station control is to be assigned.

13 Claims, 5 Drawing Figures

PROCESS FOR SPREADING THE VOLUME OF TRAFFIC OVER DIFFERENT CONTROL CHANNELS OF A CELLULAR RADIO TRANSMISSION SYSTEM

BACKGROUND OF THE INVENTION

1. Field of the Invention

The invention concerns a process for spreading the volume of traffic over different control channels of a radio transmission system.

2. Description of the Prior Art

In a radio communications system known from DE-AS No. 27 33 503 the service area constituting the entire primary coverage area is divided up into a large number of zones as in a cellular system and each radio zone is allocated at least one control channel or organisation channel and several traffic channels. In a radio zone with a large number of mobile telephone subscribers (mobile radio stations) one transmitter/receiver has to be provided in the mobile radio base station for several control channels. To simplify the transmission and reception separation filter the transmission and reception frequency band is split up into an upper and a lower band. The mobile radio stations that have been divided up into at least two groups each use one band of the transmission and reception frequency band. The division of transmission and reception frequency band into two bands is chosen so that both groups of mobile radio stations have a common band. The control channels are located in this common band.

A mobile radio station of a first group selects a control channel, e.g. for the establishment of base to mobile station connections. To this end the mobile radio station scans the control channels allocated to the group for one with a good signal-to-noise ratio. If the signal-to-noise ratio of the selected control channel deteriorates because of interference to the radio field propagation or for some other reason, then the mobile radio station, on receipt of a certain control channel code, can also use a control channel allocated to the second group. This allocation of control channels of a second group is only undertaken in a radio zone if it has a small number of mobile radio stations.

If there are several control channels available in a radio zone, then the volume of traffic corresponding to the mobile radio station located and registered as being in this radio zone is spread over the control channels of this radio zone. In the known radio transmission system (DE-AS No. 27 33 503) the mobile radio stations are split up into groups to reduce the cost of the transmitter and receiver separation filter. Regard for the traffic situation, in particular a system of control by spreading the volume of traffic over different control channels, is neither anticipated nor mentioned. If four control channels are allocated to a radio zone, for example, and if there are only two groups in the radio zone of four groups of mobile radio stations, then the volume of traffic spreads over two control channels allocated to the two groups.

If the number of control channels in a radio zone belonging to that radio zone or the frequency and consequently the channel number of a control channel changes, then the mobile radio stations should automatically and independently assign themselves to the thus formed new set of control channels. If, for example, a new control channel is allocated to the radio zone, then everything possible should be done to prevent the already existing control channels and the new control channel from becoming temporarily overloaded in the short term by a large number of individual transfers of mobile radio stations.

The problem the invention solved was to devise a process for spreading the volume of traffic over different control channels of a radio zone. In the event of a change in configuration, through a control channel failure, the mobile radio stations should require no individual change commands to locate a new control channel.

SUMMARY OF THE INVENTION

The process in accordance with the invention provides the means for obtaining an approximately uniform spread of the volume of traffic over different control channels of a radio zone of a radio transmission system.

In the case of the know radio transmission system (DE-AS No. 27 33 503), when it comes to an establishment of connections from the base radio station to the mobile radio station, the latter has to be called on all the control channels in the radio zone. This unnecessary overloading of all the control channels can be avoided by the process according to the invention. At the same time the number of transfers of mobile radio stations on an overloaded control channel can be kept low. The volume of traffic on the different control channels at any one time can be determined in the base radio station by traffic metering. The variable number of groups of mobile stations in the radio transmission system known to both the base radio station and the mobile radio station is chosen so that in each radio zone the various groups are spread as evenly as possible. The number of groups (ntp) shows into how many groups the total number of mobile radio stations located in the radio coverage area of the base radio station have been divided. The mobile radio station can assign itself to a control channel in a clear-out fashion by combining the group code number with the number of groups, and group code transmitted via the control channel. The group code (atp) in a control channel shows which groups of mobile radio stations are allowed to use that channel. By changing it the base radio station has a simple means of controlling the spread of the volume of traffic over its different control channels.

The invention will now be described in greater detail and explained on the basis of an example shown in the figures.

DESCRIPTION OF THE PREFERRED EMBODIMENTS

Figure 1:
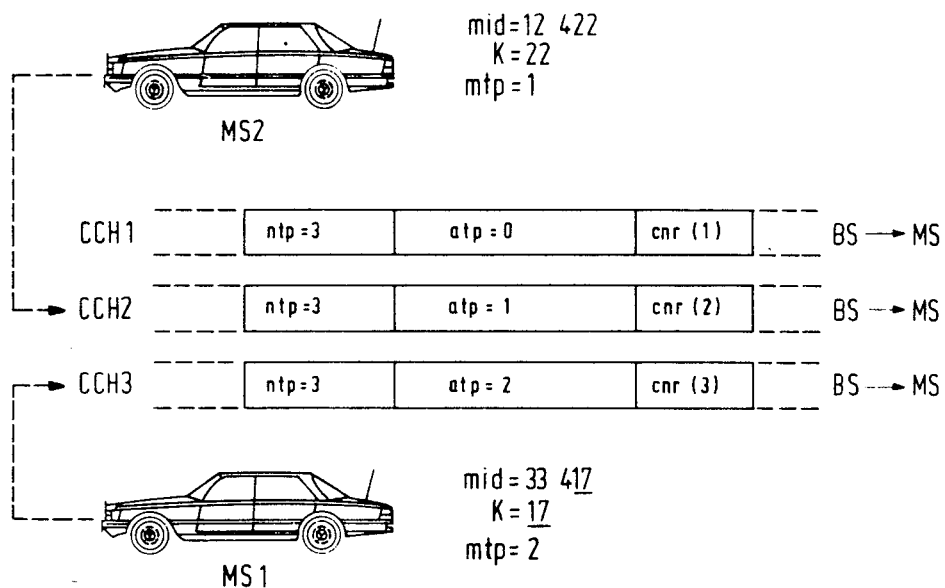
FIG. 1 shows a group code.

The radio transmission system is made of several levels that are built up on top of one another. The lowest level consists of what are known as radio zones. Depending on the height of the aerial masts of the base radio stations BS and with a transmitter power of a maximum of 50 watts the radius of these radio zones can lie between 5 and 15 km. Each radio zone is covered by a base radio station BS, which can relay conversations from and to the public telephone network via radio relay equipment. Several adjoining radio zones can be combined into what is known as a paging area. The locations of all the mobile radio stations MS are subject to constant monitoring by the base station where they are stored in an address book. If a mobile radio station MS changes its paging area, then a change is made in the address book.

If a telephone subscriber of a public telephone network wishes to contact a mobile radio station MS a selective call is transmitted in all the radio zones of the paging area in which the mobile radio station MS is monitored at that moment.

The transmission and reception frequency band lies, for example, between 860 and 960 MHz. The duplex frequency difference between transmission and reception frequency band can be 45 MHz and the transmission and reception frequency band can be subdivided into a channel spacing of 25 kHz. The channels are used in duplex operation.

Depending on the volume of traffic each radio zone of the radio transmission system is allocated a number of traffic channels and at least one control channel CCH. This means that in geographically adjoining radio zones different control channel frequencies are used. To distinguish between the control channel CCH and the traffic channel each of them is given a special code. If a control channel CCH fails or is subject to interference any traffic channel can take over the functions of the control channel CCH by a change in code. In this way it is possible to dispense with the duplication of control channels CCH that would otherwise be necessary for reasons of reliability.

In the known radio transmission system (DE-AS No. 27 33 503) a mobile radio station, once switched on, runs an orientational search for the control channel with the best signal-to-noise ratio. The channel number of this control channel is stored and the mobile radio station goes into a state of rest. The mobile radio station monitors the signal-to-noise ratio of this control channel. If the signal-to-noise ratio of the control channel stored at that moment falls below a given value, then the mobile radio station scans other control channels in a search mode and compares the signal-to-noise ratios. A change in radio zone can be identified by this comparison and the mobile radio station stores the channel number of the corresponding control channel. Accordingly there are mobile radio stations in a radio zone which are ready to transmit and receive or which at a given moment establish connections with the public telephone network or with a mobile radio station of the radio transmission system via the control channel CCH, base radio stations and radio relay equipment. In the known radio transmission system (DE-AS No. 27 33 503) the mobile radio station stores the control channel that has the highest signal-to-noise ratio. In this way, according to the traffic situation, the volume of traffic on different control channels of a radio zone may vary.

An approximately uniform spread of the volume of traffic over different control channels CCH is achieved by the base radio station BS subdividing all the mobile radio stations MS located in the area of its own radio zone into a variable number ntp of groups TP. The number of groups ntp corresponds to the number of control channels CCH, which are allocated to the base radio station BS by radio relay equipment. The base radio station BS transmits the number of groups ntp and a group code atp to the mobile radio station MS on the control channels CCH. By combining the number of groups ntp and its own identification code, mid, the mobile radio station MS derives a criterion mtp. The criterion mtp can be derived from the last two digits y z of the identification code mid, for example. The last two digits y z of the identification code mid are divided by the number of groups ntp in accordance with the algorithm.

$$mtp = (yz) \bmod (ntp).$$

If the criterion mtp and group code atp are the same the mobile radio station MS assigns itself to this control channel CCH and stores its channel number cnr. Exactly one control channel CCH is therefore allocated to each group TP in unequivocal fashion.

Interference to or a breakdown of the control channel CCH of a radio zone creates a need to reallocate the mobile radio stations MS among the remaining control channels CCH. The base radio station BS transmits the number of groups ntp and the group code atp in a control transmission CCI via the control channels CCH allocated to it.

The base radio station BS can undertake this reallocation by changing the group code atp. As soon as a mobile radio station MS recognises that the condition $$mtp = atp$$

is no longer valid it determines the criterion mtp once again, in accordance with the procedure described above. The mobile radio station MS assigns itself to that control channel CCH for which the condition $$mtp = atp$$

is again satisfied. The mobile radio station MS does not need to transfer to this new control channel CCH if it belongs to the same paging area as the control channel CCH used previously.

In the example shown in FIG. 1 the base radio station BS has chosen the variable number of groups $$ntp = 3$$

to be the same as the number n of control channels CCH. It transmits the number of groups ntp=3 along the three control channels CCH1, CCH2 and CCH3. On control channel CCH1 the base radio station BS transmits the group code atp=0, on control channel CCH2 the group code atp=1 and on channel CCH3 the group code atp=2. These are possible remainders of the division by the number 3.

A mobile radio station MS1 is assigned the group code number K=17. These group code numbers K are, for example, the last two figures of the identification code mid. The mobile radio station MS1 calculates the criterion mtp by dividing the group code number K by the number of groups ntp, in the example shown npt=3. The remainder of the division, i.e. the criterion mtp, in this case is 2. A mobile radio station MS2 calculates the criterion mtp from the group code number K=22 as being 1. The mobile radio stations MS assign themselves to those control channels CCH for which the criterion mtp is the same as the group code. In the example shown the mobile radio station MS1 assigns itself to the control channel CCH3 and the mobile radio station MS2 to the control channel CCH2. The channel numbers cnr of the control channel CCH3 and of the control channel CCH2 are stored in the mobile radio stations MS1 and MS2 respectively.

The group code number K and the specification for determining the criterion mtp in the mobile radio station MS should be chosen so that in each radio zone the number of different criteria mtp is spread as evenly as possible. If the number of groups ntp of the base radio station BS is chosen to be the same as the number n of control channels CCH allocated to it, then the allocation of the control channels CCH in the mobile radio stations MS proceeds without difficulty. On each control channel CCH the base radio station BS transmits just one group code atp, which differs from control channel CCH to control channel CCH.

Figure 2:
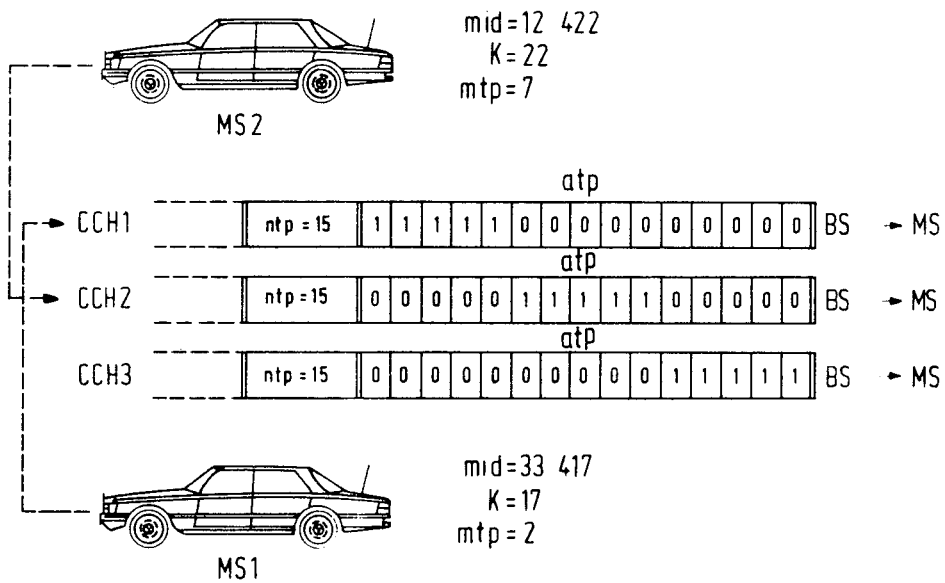
FIG. 2 shows the spread of mobile radio stations MS over control channels CCH in accordance with the invention for another group code.

Choosing the variable number of groups ntp in the base radio station BS e.g. as an integral multiple of the number n of control channels CCH makes it possible to control the spread of the volume of traffic. Even when a group code atp represents a particular bit configuration the allocation in the base radio BS and in the mobile radio stations MS can be quite straightforward. The example in FIG. 2 has a group code atp of one word with 16 bits. The base radio station BS with a number n=3 of control channels CCH (control channels CCH1, CCH2 and CCH3) selects the number of groups ntp=15. This number of groups ntp is the smallest multiple of three (n=3) with small, equal to sixteen (atp has 16 bits). The base radio station transmits a group code atp=11111 00000 00000 on control channel CCH1, a group code atp=00000 11111 00000 on control channel CCH2 and a group code atp=00000 00000 11111 on control channel CCH3. The criterion mtp=0 is assigned to the first bit of the group code atp, the criterion mtp=1 to the second bit, etc. and the criterion mtp=15 to the final bit.

The mobile radio stations MS assign themselves to a control channel CCH, when the channel has, for example, the logical 1 characteristic state at the bit location of the group code atp allocated to the criterion mtp. In the case of the example shown in FIG. 2 the mobile radio station MS1 has the criterion mtp=2 and assigns itself to the control channel CCH1 with logical 1 characteristic state at the third bit location. The mobile radio station MS2 assigns itself to the control channel CCH2 with logical 1 characteristic state at the eighth bit location.

In the case of each control channel CCH of the base radio station BS being assigned a coherent cluster of groups TP, the allocation of groups TP can be carried out on the basis of a group code atp consisting of a largest number ltp and a smallest number ftp. In the following it is assumed that in the base radio station BS the number n has been chosen as equal to two (control channels CCH1 and CCH2) and the number of groups ntp as equal to 16. The base radio station BS transmits a group code atp=1111 1111 0000 0000 on control channel CCH1 and a group code atp=0000 0000 1111 1111 on control channel CCH2. The smallest number ftp of the group code atp of control channel CCH1 is therefore zero and the largest number ltp is seven (for control channel CCH2 ftp=8 and ltp=15).

Mobile radio stations MS assign themselves to a control channel CCH when the condition $$ftp \leq mtp \leq ltp$$

is satisfied. The mobile radio station MS1 with the group code number K=17 calculates the criterion mtp=1 and assigns itself to control channel CCH1. The mobile radio station MS2 with the group code number K=22 calculates the criterion mtp=8 and assigns itself to control channel CCH2.

Figure 3:
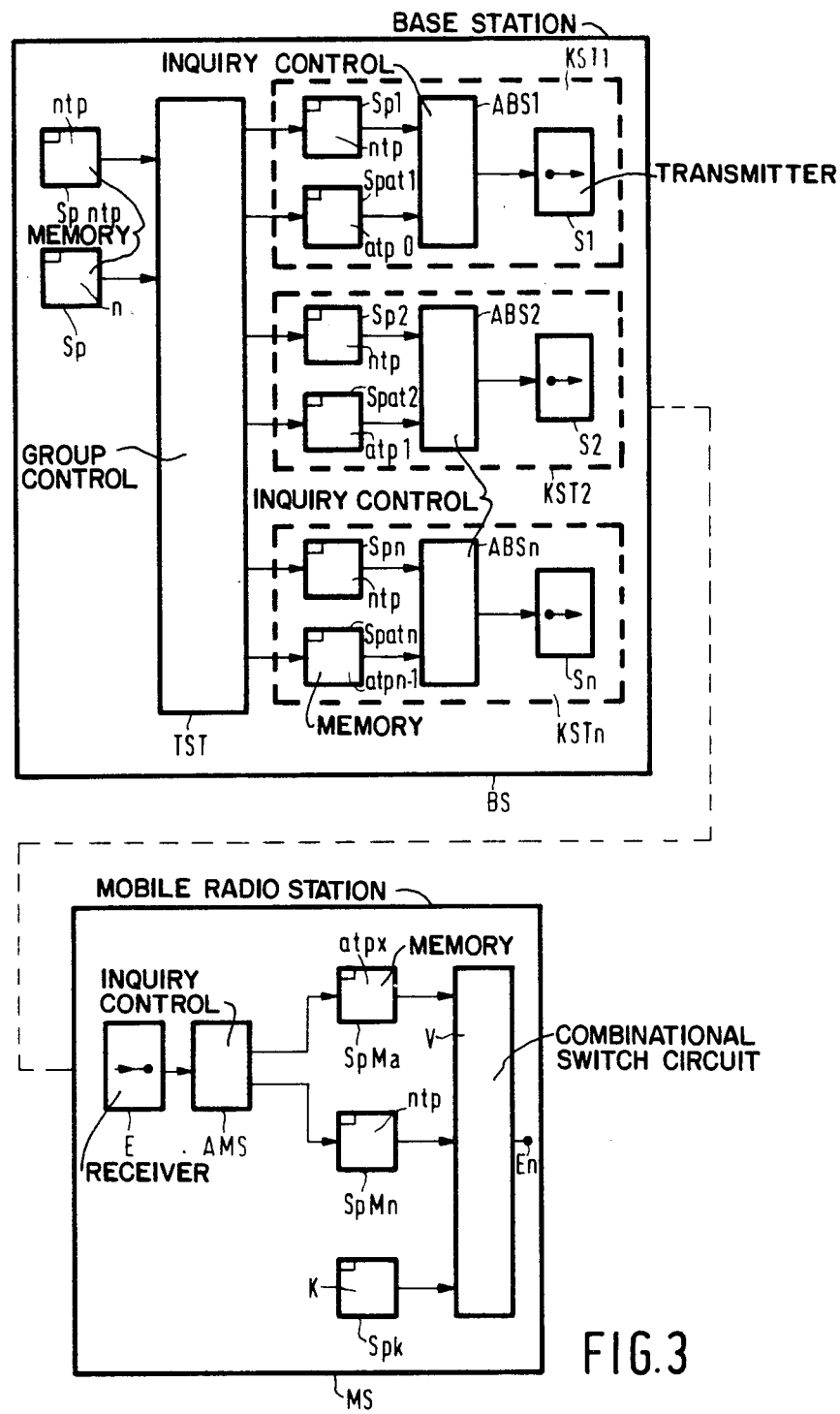
FIG. 3 is a block diagram of a cellular communication system for carrying out the process of the invention.

FIG. 3 shows an apparatus for controlling channel selection in the form of a block diagram. The base radio station BS contains memories Sp and Spntp, whose outputs are each connected to an input of a group control TST, and n channel controls KST1 to KSTn, corresponding to the number n of allocated control channels CCH.

Each channel control (e.g. KST1) has a first memory Sp1 and a second memory Spat1, whose inputs are each connected to an output of the group control TST and whose outputs are each connected to an input of an inquiry control ABS1. The output of the inquiry control ABS1 is connected to the input of a transmitter S1.

Situated in the mobile radio station MS are a receiver E with a buffer memory and an inquiry control AMS. One output of the inquiry control AMS is connected to the input of a first memory SpMa, whose output is connected to an input of a combinational switching circuit V. A second output of the inquiry control AMS is connected to the input of a second memory SpMn, whose output is connected to an input of the combinational switching circuit V. The mobile ratio station also contains a third memory SpK, whose output is connected to an input of the combinational switching circuit V.

Stored in the base station BS in the memory Sp is the number n equal to the number of control channels CCH allocated to the base radio station BS and in the memory Spntp the number of groups ntp. The two numbers n and ntp are fed to the group control TST, which derives a group code atp from these numbers for each control channel which is stored in the second memory Spatm (m=1, ... n) of the associated channel control KSTm. The number of groups ntp is stored in the first memory Spm of the associated channel control KSTm. The two numbers are read out and fed to the associated transmitter Sm by means of the inquiry control ABSm.

The transmitted group code atp and the number of groups ntp are received and buffered in the receiver E located in the mobile radio station MS. The inquiry control AMS reads these buffered numbers and feeds the group code to the memory SpMa and the number of groups to the memory SpMn. The stored number of groups ntp and the stored group code atp are combined by the combinational switching circuit V with a group code number K stored in the third memory SpK. Available at a terminal En of the combinational switching circuit V is a control signal for the allocation of the mobile radio station MS to one of the control channels CCH.

Figure 4:
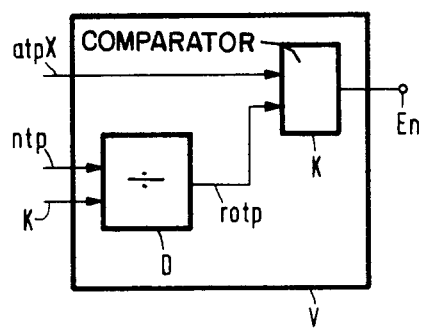
FIG. 4 is the block diagram of a combinational circuit for the mobile station of FIG. 1.

The combinational switching circuit V shown in FIG. 4 contains a comparator K and a divider circuit D. The number of groups ntp and the group code number K are combined in the divider circuit D to derive a criterion mtp by division. The criterion mtp is the remainder for the division of the group code number K by the number of groups ntp. The comparator K checks that the group code (e.g. atpX) supplied is the same as the criterion mtp.

Figure 5:
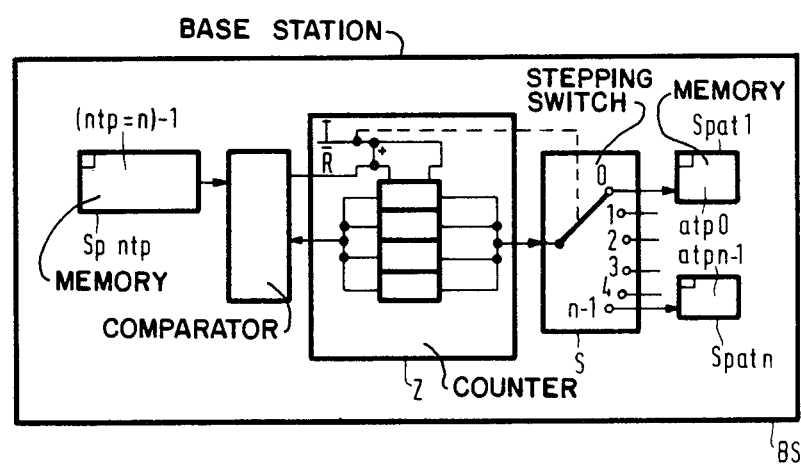
FIG. 5 is a block diagram of a base station where the number of groups N+P is equal to one less than the number of channels N.

In the base radio station BS shown in FIG. 5 the number of groups ntp, which is equal to a number n of control channels CCH allocated to the base radio station BS, less 1, is stored in the memory Spntp. The memory Spntp is connected to a comparator circuit VG, whose subsequent input is connected to a counter Z. The output of the comparator circuit VG is connected to the counter Z and resets it when the two input signals of the comparator circuit VG are the same. The ouput of the counter Z is connected to a step-by-step switching mechanism S which is continuously switched by a clock T supplied to the clock input of the counter Z. Each output $0, \ldots, (n-1)$ of the step-by-step switching mechanism S is connected to a memory Spatm $(m=1, \ldots, n)$. These memories Spatm are located in each channel control KSTm $(m=1, \ldots n)$ and store the group code atp $(m-1)$.Thus, there has been described a process for spreading the traffic between control channels linking a base station and mobile radio stations. Those skilled in the art will recognize other processes in accordance with the invention defined by the claims which follow.

What is claimed is:

1. A process for spreading the volume of traffic over different control channels of a cellular radio transmission system including a base station having at least two control channels comprising
   (a) subdividing at said base station the number of mobile radio stations (MS) in a cellular area of said base station into a variable number of groups (ntp);
   (b) transmitting from said base station the variable number of groups (ntp) and a group code (atp) on each control channel;
   (c) receiving said transmitted number of groups (ntp) and group code (atp) at each of said mobile stations;
   (e) combining at said mobile radio stations (MS) said received number of groups (ntp) and said received group code (atp) with a stored group code number (K); and
   (f) assigning at said mobile station one of said control channels to said mobile station when the result of said combining step is a predetermined number.

2. A process as in claim 1, in which the group code number (K) is part of a stored identification code (mid) of the mobile radio station (MS).

3. A process in claim 2, in which the group code number (K) is derived from the final two digits (yz) of the identification code (mid) of the mobile radio station (MS).

4. A process as in claim 1, in which the base radio station (BS) chooses the number of groups (ntp) to be the same as a number (n) of control channels (CCH) allocated to it.

5. A process as in claim 1, in which the base radio station (BS) chooses the number of groups (atp) to be larger than a number (n) of allocated control channels (CCH).

6. A process as in claim 1, in which the base radio station (BS) transmits to the mobile radio station (MS) a large and a small number ltp and ftp as parts of the group code (atp) along each control channel (CCH).

7. A process as in claim 1, in which the mobile radio station (MS) derives a criterion (mtp) from the combination of number of groups (ntp) and group code number (K) and in which the mobile radio station (MS) assigns itself to one of the control channels (CCH) according to the criterion (mtp) and group code (atp).

8. A process as in claim 7, in which the criterion (mtp) from said combining step is the result of dividing the group code number (K) by the number of groups (ntp) to determine said predetermined number.

9. A process as in claim 7, in which the group code (atp) is the same as the criterion (mtp).

10. A process as in claim 1, in which the group code (atp) is a bit configuration, each bit thereof being allocated a group (TP) of mobile stations (MS).

11. A system for spreading the volume of traffic over different control channels of a cellular radio transmission systems comprising:
    (a) a base radio station (BS) comprising a memory (SP) having stored therein a number (N) equal to a number of control channels allocated to said base station (BS), a second memory (SPntp) which stores a number of groups (ntp) of mobile radio stations in a cellular area served by said base radio station (BS);
    (b) a group control (TST) connected to said first and second memories for deriving a group code (atp) for each control channel (CCH) from the stored number of groups of mobile radio stations (ntp) and the number (N) of control channels,
    (c) a plurality of channel controls (KST1), each channel control having a first memory (SPI) for storing the number of groups of mobile radio stations (ntp) and a second memory (spat 1) for storing the group code (atp), an inquiry control (ABSI) connected to read the contents of said first memory (SPI) and said second memory (spat 1) whereby said group code and number of a groups are produced;
    (d) a plurality of channel control transmitters each connected to a respective one of said channel controls for transmitting said read memory contents including said number groups (ntp) and group code (atp);
    (e) a plurality of mobile radio stations each including a receivers for receiving all of said channel control transmitters signals, each of said receiver further including:
        (i) a first memory;
        (ii) a second memory;
        (iii) a third memory containing a group code number;
        (iv) an inquiry control unit for supplying said transmitted group code (atpo) to said first memory and said number of groups (ntp) to said second memory; and
        (v) a combinational switching circuit (V) for combining the stored group code (atpo) and stored number of groups (ntp) with said group code number K, said combination switching unit producing an assigned channel number identified by the result of the combination of said group code (atpo), stored number of groups (ntp), and group code number K.

12. A system, in which the combinational switching circuit (V) has a comparator (K) and a divider circuit (D), in which the number of groups (ntp) and the group code number (K) are combined with one another in the divider circuit (D) to derive a criterion (mtp) by division, the criterion (mtp) being the remainder of the division of group code number (K) by the number of groups (ntp) and in which the comparator (K) checks that the group code (atpo) supplied is the same as the criterion (mtp).

13. In a system for spreading the volume of control traffic over different control channels of a cellular radio transmission system having at least two control channels for transmitting a group code to a plurality of mobile station which select from said group code a control channel, a base station comprising:
  (a) a memory for storing the number of groups (ntp) of mobile radio stations equal to one less than the number of control channels allocated to said base station;
  (b) a comparator having one input connected to said memory, and a remaining input;
  (c) a counter connected to count clock pulses, said counter having an output count connected to said comparator remaining input, said counter connected to be reset by said comparator when its count equals said number of groups (ntp);
  (d) a stepping switch connected to be stepped by said counter; and
  (e) a plurality of memories, each connected to a respective channel control of one channel, each memory being selected in sequence by said stepping switch to produce for each channel a group code atp(m−1) for transmission by said channel.

* * * * *